US012643511B2

(12) United States Patent
Sasso et al.

(10) Patent No.: US 12,643,511 B2
(45) Date of Patent: Jun. 2, 2026

(54) DEVICE FOR ADJUSTING THE CLAMPING FORCE OF AN ELECTROMECHANICAL BRAKE

(71) Applicants: HITACHI ASTEMO FRANCE, Drancy (FR); HITACHI ASTEMO HEILBRONN GMBH, Heilbronn (DE)

(72) Inventors: Julien Sasso, Champs sur Marne (FR); Maxime Demandre, Stuttgart (DE); Weiqiao Wang, Paris (FR); Alex Patrao Carqueijo, Pantin (FR)

(73) Assignees: HITACHI ASTEMO FRANCE, Drancy (FR); HITACHI ASTEMO HEILBRONN GMBH, Heilbronn (DE)

( * ) Notice: Subject to any disclaimer, the term of this patent is extended or adjusted under 35 U.S.C. 154(b) by 39 days.

(21) Appl. No.: 18/717,004

(22) PCT Filed: Dec. 20, 2022

(86) PCT No.: PCT/FR2022/052449
§ 371 (c)(1),
(2) Date: Jun. 6, 2024

(87) PCT Pub. No.: WO2023/118738
PCT Pub. Date: Jun. 29, 2023

(65) Prior Publication Data
US 2025/0042370 A1      Feb. 6, 2025

(30) Foreign Application Priority Data

Dec. 21, 2021      (FR) ...................................... 2114147

(51) Int. Cl.
*B60T 8/17*          (2006.01)
*B60T 8/171*        (2006.01)
(Continued)

(52) U.S. Cl.
CPC .............. *B60T 8/172* (2013.01); *B60T 8/171* (2013.01); *B60T 13/588* (2013.01); *B60T 13/746* (2013.01); *H02P 3/04* (2013.01)

(58) Field of Classification Search
CPC .......... B60T 7/085; B60T 8/171; B60T 8/172; B60T 13/142; B60T 13/588; B60T 13/741; B60T 13/746; H02P 3/04
(Continued)

(56) References Cited

U.S. PATENT DOCUMENTS

2012/0089311 A1*   4/2012   Burnett ................... B60T 7/042
                                                                    701/70
2014/0202801 A1     7/2014   Berger et al.
(Continued)

OTHER PUBLICATIONS

International Search Report for PCT/FR2022/052449 dated Mar. 1, 2023.

*Primary Examiner* — Hai H Huynh
*Assistant Examiner* — Johnny H Hoang
(74) *Attorney, Agent, or Firm* — McDonald Hopkins LLC

(57) ABSTRACT

The clamping strategy of an electromechanical brake depends on an already existing hydraulic pressure, in order to adjust the mechanical component of the clamping force and avoid an excessive clamping of the brake. The hydraulic component ($F_{Hyd}$) of the clamping force is estimated according to a pressure measurement, subtracted from a target force ($F_{Tar}$) to obtain the mechanical component to be applied ($F_{TarNew}$), and the electric motor for controlling clamping of the brake is stopped at a threshold value ($I_2$) of the current that is supplied thereto, according to the value of this mechanical component to be applied.

12 Claims, 4 Drawing Sheets

(51) Int. Cl.
  B60T 8/172 (2006.01)
  B60T 13/58 (2006.01)
  B60T 13/74 (2006.01)
  H02P 3/04 (2006.01)

(58) Field of Classification Search
  USPC ......................................... 701/45–48, 70–81
  See application file for complete search history.

(56) References Cited

U.S. PATENT DOCUMENTS

| | | | |
|---|---|---|---|
| 2014/0214269 A1* | 7/2014 | Knechtges | B60T 13/741 |
| | | | 701/34.4 |
| 2018/0029573 A1 | 2/2018 | Englert et al. | |
| 2018/0037208 A1 | 2/2018 | Englert et al. | |
| 2018/0126969 A1 | 5/2018 | Blattert et al. | |
| 2018/0148023 A1 | 5/2018 | Mannherz et al. | |

\* cited by examiner

E50 — CLAMPING DECIDED

E51 — PRESSURE MEASUREMENT

E52 — PRESSURE VALUE CORRECTION

E53 — FORCE HYDRAULIC COMPONENT

E54 — FORCE MECHANICAL COMPONENT

E55 — VALUE THRESHOLD OF THE CURRENT

E56 — MOTOR START-UP

E57 — THRESHOLD REACHED?    NO

YES

E58 — STOP

1

DEVICE FOR ADJUSTING THE CLAMPING FORCE OF AN ELECTROMECHANICAL BRAKE

CROSS-REFERENCE TO RELATED APPLICATIONS

This is the National Stage application of PCT international application PCT/FR2022/052449, filed on Dec. 20, 2022, which claims the priority of French Patent Application No. 2114147, filed Dec. 21, 2021, both of which are incorporated herein by reference in their entireties.

The invention relates to a clamping force adjustment device for an electromechanical brake.

Many vehicles comprise electromechanical brakes for at least some of their wheels. Such brakes can be used as parking brakes, but also as service brakes during the movements of the vehicle and as emergency brakes in particular circumstances. When used as service brake, the braking that they impose depends on the pressure on the brake pedal by the driver and on the hydraulic pressure that it then applies. In parking brake and emergency brake circumstances, a motor control unit automatically applies brake clamping strategies, predefined according to various parameters of the state or of driving of the vehicle, by imposing clamping movements to an actuator of the brake, by activating an electric motor.

Many clamping strategies consist in applying a clamping force determined according to the continuous measurement of the electric current that should be applied to the electric motor to carry on the clamping movement. The drawback of this simple strategy is that it does not take account of the hydraulic pressure which might already be present in the brake and exerts a clamping preliminary force. The force applied by the strategy then adds to this preliminary force, and the obtained total force when the strategy stops exceeds the force required to guarantee clamping: excessive clamping ("overclamping") which is reached has the drawback of prematurely wearing the brake by loading it too strongly, while unnecessarily consuming energy for clamping, then for loosening which will follow later on.

Hence, the invention aims to avoid excessive clamping of electromechanical brakes by blindly applying a strategy independent of a hydraulic pressure already present in the brake.

It is specifically desired to obtain as much as possible a clamping final force that is invariable, independently of the hydraulic pressure applied initially.

Another aim of the invention is to estimate and correlate for calculation the two hydraulic and mechanical force components which together participate to clamping of the brake, although they depend on physical phenomena and heterogeneous mechanisms, and are obtained according to measurements and calibrations that could be inaccurate, to still obtain the above-mentioned result of a substantially invariable final clamping force, with a satisfactory accuracy.

Still another aim of the invention is to ensure that a sufficient clamping force is maintained, even under the circumstances where the hydraulic pressure will not be maintained, due to a release of pressure on the brake pedal by the driver.

According to a first general aspect, the invention relates to a motor control unit intended to control an electric motor of an actuator of a vehicle electromechanical brake, comprising:

a module for supplying commands to the electric motor, including commands for clamping the brake;

a module for continuous measurements of values of an electric current supplied to the electric motor during clamping commands;

a module for measuring a hydraulic pressure applied to the brake;

and a decision module, designed to control the command supply module according to predefined strategies, the strategies comprising, for the clamping commands, a stoppage of the clamping at a target clamping force applied by the brake, the stoppage being decided by the decision module according to the measurements of the values of the electric current according to the measurement of the hydraulic pressure.

In the invention, the mechanical clamping force mechanical component applied by the brake is correlated with the value of the current necessary for the electric motor moving the actuator of the brake, and clamping is stopped when the sum of the mechanical component and of the clamping hydraulic component, estimated thanks to the pressure measurement, reaches a target value defined by the strategy.

According to a second general aspect, the invention relates to an electromechanical brake device for a vehicle, comprising said brake, which is associated with a wheel of the vehicle, an actuator of the brake, said electric motor of the actuator, and the motor control unit of the preceding electric motor.

According to some optional improvements of the invention:

the decision module is designed to estimate a total clamping force applied to the brake by adding a first component depending on the values of the electric current and a second component depending on an estimate of the hydraulic pressure;

the hydraulic pressure measurement is made at a master cylinder of the vehicle;

the estimate of the estimated hydraulic pressure is equal to the measurement of the hydraulic pressure reduced by a fixed value;

the fixed value is from 7 to 15 bar;

the fixed value is 10 bars;

the second component is proportional to the estimate of the hydraulic pressure, by applying a reduction coefficient to said estimate of the hydraulic pressure;

the reduction coefficient is fixed and comprised between 15% and 30%;

the reduction coefficient is 20%;

the decision module is designed to estimate the second component, then estimate a value of the force first component for which the clamping force will be equal to the target clamping force, and to stop the command supply module when a threshold of the electric current, estimated as corresponding to said value of the force first component, is measured.

Another object of the invention is a vehicle provided with an electromechanical brake device according to the foregoing.

The invention will now be described in its different aspects, features and advantages by means of the following figures, which illustrate a preferred embodiment, given for merely illustrative purposes.

FIG. 1 schematically shows a motor vehicle;

Figure 5:
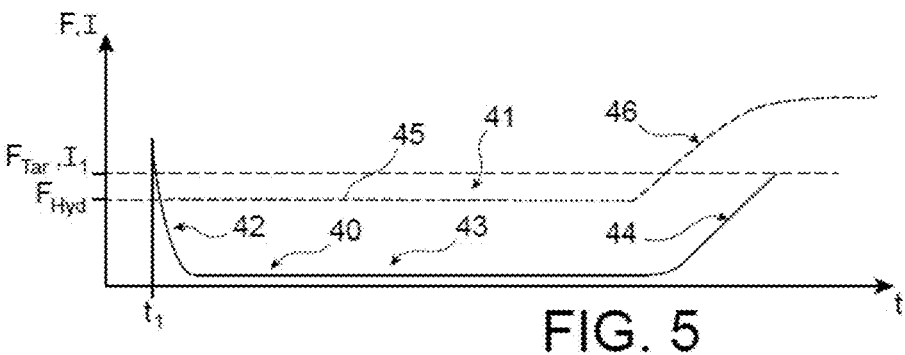
Figure 6:
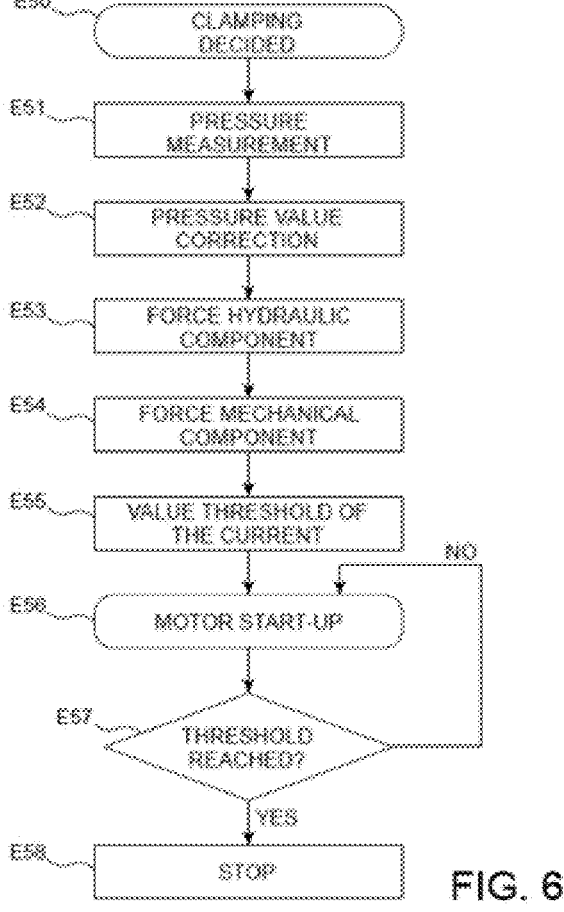
Figure 7:
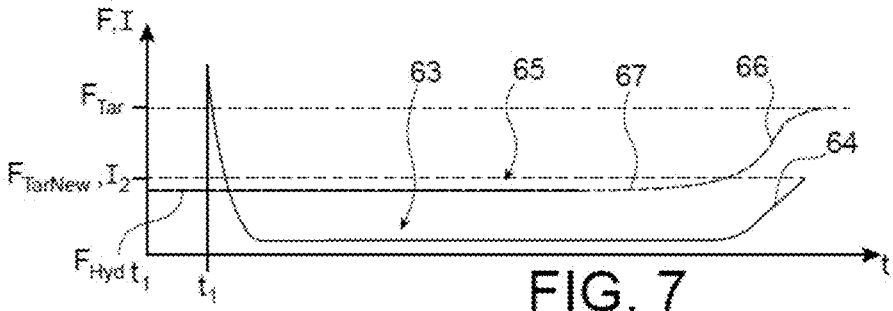
Figure 8:
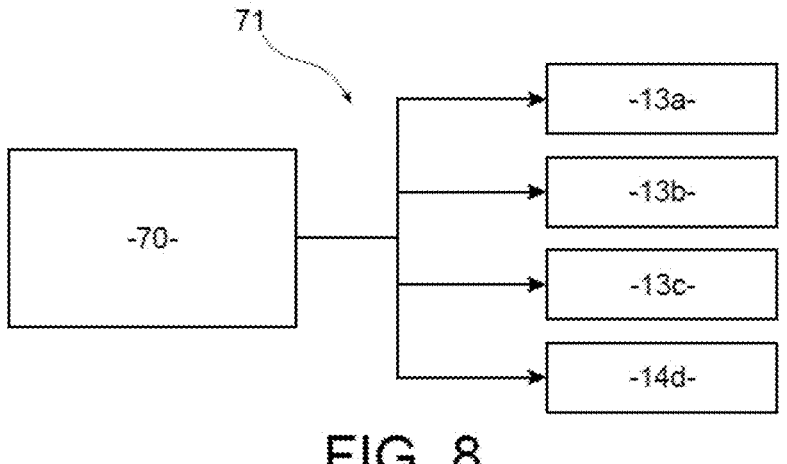

FIG. 5, another conduct of this known strategy;

FIG. 6 illustrates a flowchart of the method for clamping of the brake according to the strategy of the invention;

FIG. 7, the conduct of a strategy in accordance with the invention;

and FIG. 8 is a diagram of a braking hydraulic circuit.

Figure 1:
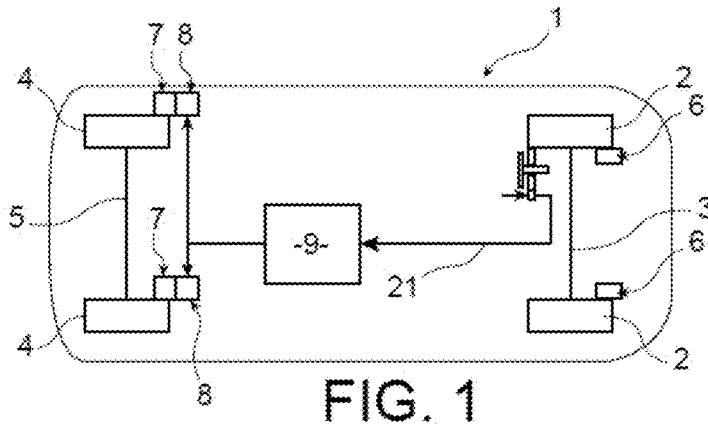

FIG. 1 shows a motor vehicle 1 equipped with two driving and steered front wheels 2 on a front axle 3, and two non-driving and non-steered rear wheels 4 on a rear axle 5. Each of the front wheels 2 is herein equipped with a service brake 6 activated directly by the driver by pressing on a brake pedal, and each of the rear wheels 4 is equipped with a brake 7 described hereinafter in detail, and which is associated with an actuator 8 able to make it work as a parking and emergency brake. The actuators 8 of the two brakes 7 are controlled by the same motor control unit 9 according to various information relating to some parameters of the vehicle 1 and to its driving state. The motor control unit 9 is active when an emergency braking becomes necessary or a parking is requested. For the hydraulic service braking functions, the brakes 7 are also activated by the driver at the same time as the brakes 6 at the front.

Figure 2:
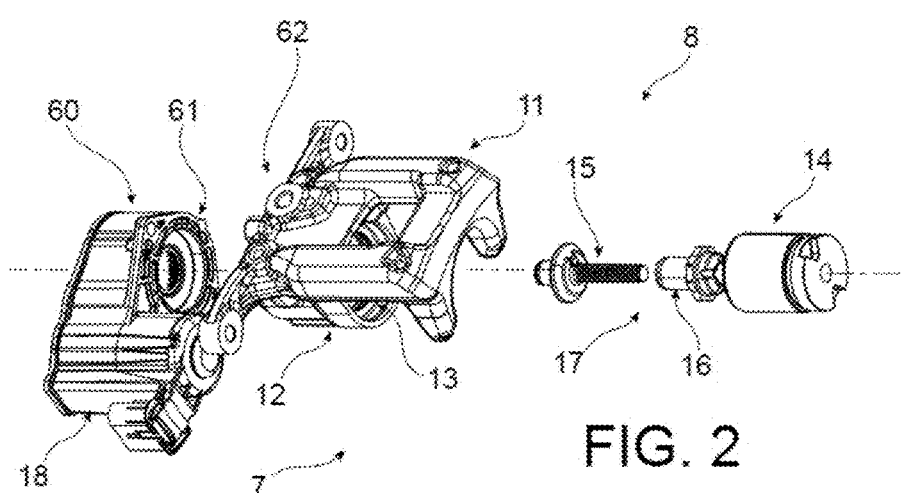
FIG. 2 illustrates an exploded brake including a parking device.

FIG. 2 schematically illustrates a known and non-limiting embodiment of the brake 7, according to an exploded view. The brake 7 comprises a calliper 11 fastened to a case 12 with a cylindrical shape. It also comprises a geared motor 60, a flange 61 of which is fastened to a flange 62 at the rear face of the case 12 by screws (not shown herein). The geared motor 60 contains an electric motor 18 and gears for reducing the rotational speed of said electric motor 18. The case 12 comprises a hydraulic cavity 13, so-called the cylinder, open towards the front (on the right in FIG. 2) and in which a piston 14 bearing a movable pad (not shown) slides. The braking operations are carried out by making the piston 14 slide forwards, to bring the movable pad closer to a fixed pad located at the front end of the calliper 11 and to clasp a disk of the rear wheel 4 between these pads. This movement of the piston 14 is obtained, when the brake 7 works as a service brake, by application of a hydraulic pressure in the hydraulic cavity 13 when driving the vehicle: this pressure is exerted on the rear face of the piston 41 and pushes it forwards. If, nonetheless, the brake 7 is controlled as a parking brake or as an emergency brake, the braking operations are carried out by using the electric motor 18 according to strategies imposed by the motor control unit 9. The electric motor 18 moves the gears of the geared motor 60, which rotates a screw 15 which extends into the hydraulic cavity 13. The screw 15 is engaged with a nut 16 on which a rear face of the piston 14 then abuts. The rotations of the screw 15 are converted into translations of the nut 16 and of the piston 14, which moves according to the duration of actuation of the electric motor 18. In particular, the actuator 8 considered herein comprises the geared motor 60 and therefore its electric motor 18, and the system 17 composed of the screw 15 and of the nut 16.

The invention could be applied to other vehicles and other brakes than these.

Figure 3:
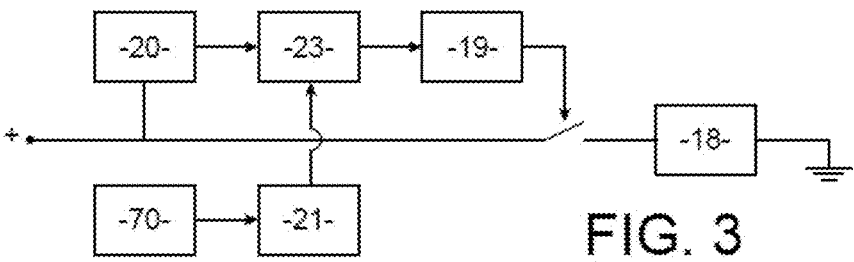
FIG. 3 illustrates the motor control unit of said brake.

FIG. 3 illustrates the motor control unit 9 in more detail: it comprises: a command supply module 19 which supplies commands to the electric motor 18 according to the predefined strategies, by being connected to a battery or another energy source present in the vehicle 1; a current measurement module 20 which measures the intensity of the current in the electrical circuit on which the electric motor 18 and said energy source are installed; a pressure measurement module 21 which measures a hydraulic pressure in the braking system; and a decision module 23 which connects the command supply module 19 and measurement modules 20 and 21, and which uses the output signal of the measurement modules 20 and 21 to adjust the duration of the commands.

Figure 4:
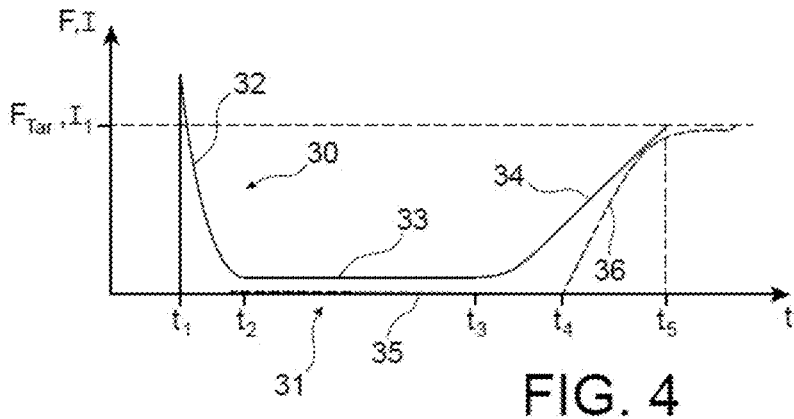
FIG. 4 illustrates the conduct of a known strategy applying a mechanical force component with a uniform value for clamping of an electromechanical brake.

Reference is made to FIG. 4. It illustrates a diagram 30 of the electric current I applied to the electric motor 18, and a corresponding diagram 31 of the clamping force F of the brake 7 during the known strategy, as a function of time t, and in the absence of hydraulic pressure in the brake 7. The current diagram 30 comprises three successive portions: a start-up peak 32, a flat portion 33, and an increasing portion 34.

The start-up peak portion 32 starts as of the time point $t_1$ of application of the strategy, has a short duration and a high value; it corresponds to start-up of the motor and does not produce clamping.

The flat portion 33, with a relatively long duration, corresponds to an off-load stroke of the piston 14 before clamping actually starts and is performed at a substantially constant and low value of the current I starting from a time point $t_2$.

And the increasing portion 34 starts at a time point $t_3$ and has a slope that is substantially uniform over time. It corresponds to a progressive increase of the clamping force F, or of its mechanical component.

The force diagram 31 comprises a zero (or negligible) force portion 35, then an increasing force portion 36 starting at a time point $t_4$ simultaneous or almost simultaneous with the time point $t_3$. The increase in the clamping force F has a slope substantially invariable in this increasing portion 36, so that the clamping force could, at least approximately, be correlated with the value of the current I by a proportionality relationship. The clamping strategy is stopped when a intensity threshold $I_1$ of the current I, correlated with a target force $F_{Tar}$ of clamping, is reached. Afterwards, the clamping force F varies very little.

Now, if the known strategy is applied whereas a hydraulic clamping already exists, its conduct is as follows according to FIG. 5. The current diagram, now 40, also has a start-up peak portion 42, a flat portion 43 and an increasing portion 44, similar to the previous ones, except that the durations of the flat portion 43 and of the increasing portion 44 may be different. Like before, the increasing portion 44 is interrupted at the intensity threshold 11, identical to the previous one, of the current I.

Yet, the force diagram, now 41, starts at a non-zero value $F_{Hyd}$ because of the hydraulic pressure. It remains constant over a flat portion 43 of the diagram, then increases over an increasing portion 46 which starts substantially at the same time as the increasing portion 44. Its slope is substantially the same as in FIG. 4, such that the force exceeds, possibly much, the target force $F_{Tar}$ at the end of the strategy, which corresponds to an excessive clamping ("overclamp") detrimental to the duration of the brake and to the proper operation of the vehicle 1 in general.

The modified strategy according to the invention is schematised in FIG. 6. A first step is a decision (E50) to apply the clamping strategy, and the motor is activated (E51). There follows a step of measuring the hydraulic pressure (E52), a step of correcting the measurement (E53), and a step of calculating the force hydraulic component $F_{Hyd}$ already applied to the brake 7 (E54); then a step of calculating the force mechanical component to be applied $F_{TarNew}$ (E55), a step (E56) of estimating the final value of the current necessary to apply this mechanical component (modified threshold $I_2$ of the current intensity). The measurements of the electric current (E57) are engaged immediately after clamping has been decided, and they are compared (E58) with the final value determined in step E56. The strategy is carried on as long as the values of the repetitive measurements of the current remain lower than the modified threshold $I_2$, and interrupted when the current measurement values reach this threshold. The motor is then stopped (E59).

In the absence of an initial hydraulic pressure resulting from a service braking of the wheel of the vehicle, the strategy of parking braking by the electromechanical brake has a conduct identical to that of FIG. 4. If, on the contrary, a hydraulic pressure, in particular constant or at least not increasing, is already applied following a service braking, FIG. 7 shows that the current diagram 40 is replaced by a current diagram 63 which differs in that the increasing portion, now 64, is shorter by stopping at the modified threshold 12, lower than $I_1$, calculated in step E55. The corresponding force diagram 65 also includes an increasing portion, now 66, which is shorter and which stops near the target force $F_{Tar}$ (unchanged with regards to the known strategy), since the mechanical component of the clamping force, for parking braking of the wheel, has been reduced by a value corresponding as much as possible to the existing hydraulic component. This hydraulic component $F_{Hyd}$ is maintained over a flat portion 67, corresponding to the flat portion 45, of the force diagram 61.

Here are now the rules applied in this particular embodiment of the invention to improve the accuracy of the clamping force or make the modified strategy perfectly safe.

FIG. 8 shows a braking hydraulic circuit, comprising a master cylinder 70, a pressure amplifier, a pump or any other source of pressurised brake fluid, in communication via a pipework 71 to the cylinders 13a to 13d of the brakes 6 and 7, electromechanical or not, equipping the wheels 2 and 4 of the vehicle 1. The existing hydraulic pressure is preferably measured at the master cylinder 70 rather than the cylinders 13a to 13d, as it could be estimated with a greater accuracy.

A correction of the measured value $P_{mes}$ is applied to take account of the uncertainties of the measurements. For common braking systems where the hydraulic pressure could reach about 150 bars (15 MPa), it may be from 7 to 15 bar (0.7 to 1.5 Mpa), and for example from 10 bar (1 Mpa). The measured value $P_{mes}$ is reduced by this value, in order not to overestimate the hydraulic component of clamping force and to guarantee a sufficient final clamping. This correction value is denoted $P_{corr}$.

It is also necessary to guard against subsequent decreases in the hydraulic pressure, in particular if the brake pedal was released. It has been noticed that the pressure loss would then be moderate. It is possible to apply a reduction coefficient $K_{corr}$ comprised between 15 and 30% (between 0.15 and 0.30 in the formula hereinbelow), and for example around 20%.

An estimated pressure Pest is then obtained, by means of which the hydraulic force $F_{Hyd}$ is calculated, according to the following formula:

$$P_{est} = (P_{mes} - P_{corr}),$$

and the force hydraulic component may be estimated by the formula:

$$F_{Hyd} = P_{est}(\phi/2)^2 \cdot \pi \cdot (1 - K_{corr}),$$

wherein $\phi$ is the diameter of the piston 14.

The desired mechanical component $F_{TarNew}$ to obtain the target clamping force $F_{Tar}$ is given by the following formula:

$$F_{TarNew} = F_{Tar} - F_{Hyd},$$

and the value of the modified threshold I2 at which the strategy is stopped may be obtained by a formula such that:

$$I_2 = I_1 \cdot (F_{TarNew} / F_{Tar}),$$

possibly adjusted according to the behaviour characteristics, obtained empirically, of the brake 7 and of the actuator 8.

The invention may be implemented in different ways: the calculations of correction or re-evaluation of the applied hydraulic pressure and of the force mechanical component to be applied could thus be done according to an order other than that of steps E53 to E56. The hydraulic pressure measurement may be done with a sensor already existing on the vehicle 1, and may be renewed, or not, during the application of the strategy.

Nomenclature

1 Motor vehicle
2 Front wheel
3 Front axle
4 Rear wheel
5 Rear axle
6 Brake
7 Electromechanical brake
8 Actuator
9 Motor control unit
11 Calliper
12 Case
13, 13a to 13d Cylinder
14 Piston
15 Screw
16 Nut
17 Screw-nut system
18 Electric motor
19 Command supply module
20 Current measurement module
21 Pressure measurement module
23 Decision module
30 Current diagram
31 Force diagram
32 Start-up peak
33 Flat portion
34 Increasing portion
35 Flat portion
36 Increasing portion
40 Current diagram
41 Force diagram
42 Start-up peak
43 Flat portion
44 Increasing portion
45 Flat portion
46 Increasing portion
60 Geared motor
61 Flange
62 Flange
63 Current diagram
64 Increasing portion

65 Force diagram
66 Increasing portion
67 Flat portion
70 Master cylinder
71 Pipework
E50 Clamping decision
E51 Start-up
E52 Pressure measurement
E53 Correction
E54 Hydraulic component
E55 Mechanical component
E56 Current threshold
E57 Measurement of the current
E58 Threshold reached?
E59 Stop
F Clamping force
$F_{Hyd}$ Force hydraulic component
$F_{Tar}$ Target clamping force
$F_{TarNew}$ Target mechanical component
I Intensity of the electric current
$I_1$ Stop threshold
$I_2$ Modified stop threshold
$K_{corr}$ Correction coefficient
$P_{mes}$ Measured pressure
$P_{corr}$ Correction pressure
Pest Estimated pressure
$t_1$ to $t_5$ Times points of the time diagrams
t Time

What is claimed is:

1. A motor control unit configured to control an electric motor of an actuator of an electromechanical parking brake when parking braking a wheel of a motor vehicle, comprising:

a module for supplying commands to the electric motor, including brake clamping commands;

a module for continuous measurements of values of an electric current supplied to the electric motor during the brake clamping commands;

a module for measuring a hydraulic pressure in a braking hydraulic circuit; and a decision module, designed to control the command supply module according to predefined strategies, the strategies comprising, for the brake clamping commands, stopping the clamping at a target clamping force applied by the electromechanical parking brake, the stopping being decided by the decision module according to the measurements of the values of the electric current and according to a measured hydraulic pressure, wherein the decision module is adapted to estimate a total clamping force applied to the electromechanical parking brake by adding an electromechanical component depending on the values of the electric current and a hydraulic component depending on an estimate of a hydraulic pressure applied to the electromechanical parking brake and resulting from a previous service braking of the wheel, based on a hydraulic pressure measurement provided by said module for measuring a hydraulic pressure, and wherein the decision module is adapted to estimate the hydraulic component, then estimate a value of the electromechanical component for which the total clamping force will be equal to the target clamping force, and then control the command supply module to stop the clamping when a threshold of the electric current, estimated as corresponding to said value of the electromechanical component, is measured.

2. An electromechanical parking brake device for a motor vehicle, comprising an electromechanical parking brake, which is associated with a wheel of the vehicle, an actuator of the electromechanical parking brake, an electric motor of the actuator, and a motor control unit according to claim 1 configured to control the electric motor of the actuator.

3. A motor vehicle comprising an electromechanical parking brake device according to claim 2.

4. The motor control unit according to claim 1, wherein the module for measuring a hydraulic pressure in the braking hydraulic circuit is configured to take the hydraulic pressure measurement at a master cylinder of the braking hydraulic circuit.

5. The motor control unit according to claim 1, wherein the estimate of the hydraulic pressure applied to the electromechanical parking brake is equal to the hydraulic pressure measurement reduced by a fixed value.

6. The motor control unit according to claim 5, wherein the fixed value is from 7 to 15 bar.

7. The motor control unit according to claim 5, wherein the fixed value is 10 bar.

8. The motor control unit according to claim 1, wherein the hydraulic component is computed by applying a reduction coefficient to the estimate of the hydraulic pressure applied to the electromechanical parking brake, to which the hydraulic component is thereby proportional.

9. The motor control unit according to claim 8, wherein the reduction coefficient is fixed and comprised between 15% and 30%.

10. The motor control unit according to claim 9, wherein the reduction coefficient is 20%.

11. The motor control unit according to claim 1, configured so that the hydraulic component does not increase during parking braking, the hydraulic component preferably being substantially constant during parking braking.

12. The motor control unit according to claim 1, wherein the decision module is designed to carry out a braking control method consisting of the following steps successively and in that order: estimating the hydraulic component, then estimating a value of the electromechanical component for which the clamping force will be equal to the target clamping force, and controlling the command supply module to stop the clamping when a threshold of the electric current, estimated as corresponding to said value of the electromechanical component, is measured.

* * * * *